C. L. COTTER.
ANIMAL TOY.
APPLICATION FILED JUNE 19, 1919.

1,363,570.

Patented Dec. 28, 1920.

Witness:
R. E. Hamilton

Inventor,
Catherine L. Cotter,
By Warren D. House
Her Attorney.

UNITED STATES PATENT OFFICE.

CATHERINE L. COTTER, OF KANSAS CITY, MISSOURI.

ANIMAL TOY.

1,363,570. Specification of Letters Patent. Patented Dec. 28, 1920.

Application filed June 19, 1919. Serial No. 305,357.

*To all whom it may concern:*

Be it known that I, CATHERINE L. COTTER, a citizen of the United States, residing at Kansas City, in the county of Jackson and State of Missouri, have invented a certain new and useful Improvement in Animal Toys, of which the following is a specification.

My invention relates to improvements in animal toys.

The object of my invention is to provide a toy representing an animal adapted to contain a mobile material, such as water or sand, which is simple in construction, cheap to manufacture, durable, and which is adapted to afford amusement to children.

The novel features of my invention are hereinafter fully described and claimed.

In the accompanying drawing, which illustrates the preferred embodiment of my invention, Figure 1 is a side elevation of my improved toy, partly broken away.

Similar reference characters designate similar parts in the different views.

Figure 1:
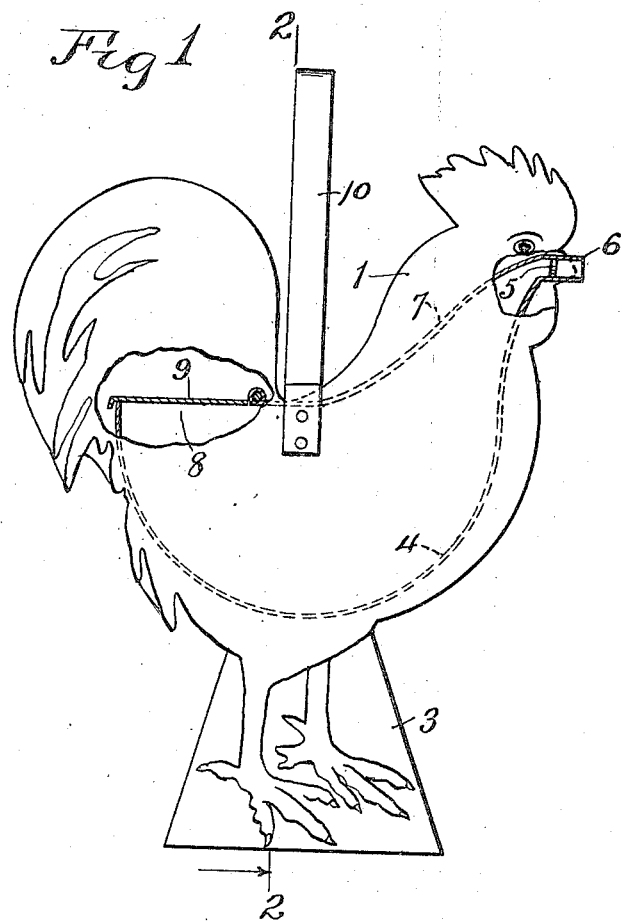
Figure 2:
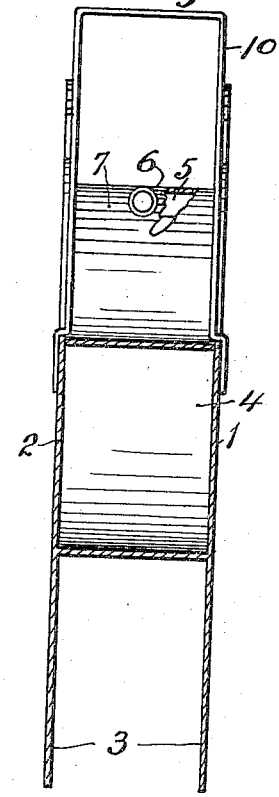
Fig. 2 is a vertical sectional view on the line 2—2 of Fig. 1.
Figure 3:
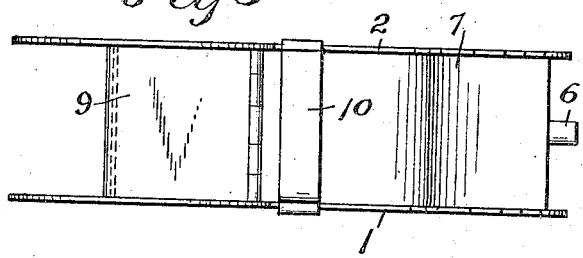
Fig. 3 is a plan view of the same.

1 and 2 designate two upright side members respectively representing opposite sides of an animal, the animal represented in the drawing being a rooster. Each side member is provided at its lower end with a foot 3, preferably having a horizontal flat lower edge which serves to support the toy and which is located in a place corresponding to a foot of the animal.

Connecting the side members 1 and 2 are means coöperating therewith to form a container adapted to hold mobile material, such as water or sand. Such means may comprise a transverse sheet metal member having an arcuate lower portion 4 having a concave upper side and provided with an upright transverse portion 5 having a discharge spout 6 located at the place corresponding to the mouth of the animal between the side members 1 and 2. The transverse member has an upper portion 7 which extends rearwardly from the top of the portion 5 to a point spaced apart from the rear end of the portion 4 so as to form a filling opening 8 in the upper side of the container, which is adapted to be closed by a cover 9 hinged to the rear end of the portion 7 and in the closed position resting upon the rear end of the portion 4.

An upwardly extending handle 10, of inverted U-shape, has its ends respectively attached to the side members 1 and 2.

Figure 4:
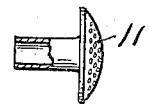
Fig. 4 is a side view, partly in elevation, and partly in vertical section, of a sprinkler rose, adapted to be used on the spout of the toy.

If desired, a sprinkler rose 11, of the ordinary type shown in Fig. 4, may be slipped onto the discharge spout 6.

In the operation of the toy, the lid 9 being lifted, sand or water may be poured into the container through the filling opening 8 and discharged therefrom through the spout 6.

The side members 1 and 2, connecting members 4, 5 and 7, cover 9 and handle 10 may be made of sheet metal such as tin or galvanized iron. The outer sides of the side members may be painted or otherwise decorated to enhance the simulation of the toy to the animal which it represents.

I do not limit my invention to the structure shown and described, as many modifications may be made, within the scope of the appended claims, without departing from the spirit of my invention.

What I claim is:—

An animal toy comprising a container for mobile material, such as water or sand, having two upright side members respectively corresponding to opposite sides of an animal, a transverse member connecting said side members and formed so as to coöperate therewith to hold said material, the transverse member at a place corresponding to the mouth of the animal having a discharge spout, each side member having a supporting foot corresponding to a foot of the animal, the transverse member being doubled upon itself to form a closed top having a filling opening, and a cover hinged to one end of said transverse member, in the closed position resting on the other end of said transverse member for closing said filling opening.

In testimony whereof I have signed my name to this specification.

CATHERINE L. COTTER.